United States Patent
Jia et al.

(10) Patent No.: US 10,917,167 B2
(45) Date of Patent: Feb. 9, 2021

(54) MC-CDMA WITH LOW PEAK-TO-AVERAGE POWER RATIO MULTI-CARRIER WAVEFORM

(71) Applicants: Ming Jia, Ottawa (CA); Jianglei Ma, Ottawa (CA)

(72) Inventors: Ming Jia, Ottawa (CA); Jianglei Ma, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/164,388

(22) Filed: May 25, 2016

(65) Prior Publication Data
US 2016/0352478 A1 Dec. 1, 2016

Related U.S. Application Data

(60) Provisional application No. 62/168,437, filed on May 29, 2015, provisional application No. 62/262,142, filed on Dec. 2, 2015.

(51) Int. Cl.
*H04L 27/26* (2006.01)
*H04L 5/00* (2006.01)
(Continued)

(52) U.S. Cl.
CPC .......... *H04B 7/2628* (2013.01); *H04J 11/004* (2013.01); *H04L 5/0021* (2013.01);
(Continued)

(58) Field of Classification Search
CPC .. H04L 5/0007; H04L 5/0021; H04L 27/2601
(Continued)

(56) References Cited

U.S. PATENT DOCUMENTS

| 7,860,147 B2 | 12/2010 | Moffatt | |
| 2003/0100278 A1* | 5/2003 | Devaney | H03D 3/04 455/131 |

(Continued)

FOREIGN PATENT DOCUMENTS

| CN | 101272372 A | 9/2008 |
| CN | 101692664 A | 4/2010 |

(Continued)

OTHER PUBLICATIONS

Irfan, Mohammad et al., SubCarrier Index—QAM, A New Hybrid Modulation Scheme for OFDM, The Institute of Industrial Applications Engineers, Japan, Mar. 2015, pp. 74-77.

(Continued)

*Primary Examiner* — Asad M Nawaz
*Assistant Examiner* — Jason A Harley

(57) ABSTRACT

Methods, devices and systems are provided for spreading and transmitting data in a wireless communications system such that the resulting waveforms that are transmitted have low Peak to Average Power Ratio and mitigate signal collisions between different devices. The method for spreading and transmitting data includes spreading data with a sparse spreading sequence having equally spaced non-zero subcarrier elements to generate multi-carrier spread data on subcarriers corresponding to the equally spaced non-zero subcarrier elements of the spreading sequence; and transmitting the multi-carrier spread data. Different spreading sequences may be assigned to different user devices. The different spreading sequences may differ in terms of sparsity level in the frequency domain, sparsity pattern in the frequency domain and/or pulse offset in the time domain. Multiple multi-carrier spread data streams may be received by a network node and decoded using Successive Interference Cancellation (SIC) techniques.

28 Claims, 6 Drawing Sheets

(51) Int. Cl.
  *H04B 1/69* (2011.01)
  *H04W 72/12* (2009.01)
  *H04B 7/26* (2006.01)
  *H04J 11/00* (2006.01)
(52) U.S. Cl.
  CPC ...... *H04L 27/2601* (2013.01); *H04L 27/2634* (2013.01); *H04L 27/2614* (2013.01)
(58) Field of Classification Search
  USPC .......................................... 375/295; 370/252
  See application file for complete search history.

(56) References Cited

U.S. PATENT DOCUMENTS

| | | | |
|---|---|---|---|
| 2003/0112744 A1* | 6/2003 | Baum | H04L 1/0015 370/206 |
| 2004/0252631 A1* | 12/2004 | Park | H04L 25/03834 370/210 |
| 2005/0111425 A1* | 5/2005 | Mottier | H04J 13/18 370/342 |
| 2005/0250460 A1* | 11/2005 | Cleveland | H04L 27/2647 455/134 |
| 2007/0081604 A1 | 4/2007 | Khan et al. | |
| 2007/0291635 A1* | 12/2007 | Yang | H04L 5/0007 370/208 |
| 2008/0043814 A1 | 2/2008 | Moffatt | |
| 2009/0022207 A1 | 1/2009 | Brethour et al. | |
| 2009/0125260 A1* | 5/2009 | Bosnecker | G01R 19/2509 702/77 |
| 2010/0165829 A1 | 7/2010 | Narasimha et al. | |
| 2010/0254484 A1 | 10/2010 | Hamaguchi et al. | |
| 2011/0110246 A1* | 5/2011 | Damnjanovic | H04L 5/06 370/252 |
| 2011/0116455 A1* | 5/2011 | Damnjanovic | H04L 1/0028 370/329 |
| 2012/0127952 A1* | 5/2012 | Tong | H04B 7/0408 370/330 |
| 2012/0155422 A1* | 6/2012 | Medbo | H04L 5/0035 370/330 |
| 2012/0230371 A1* | 9/2012 | Chiskis | G01S 13/284 375/143 |
| 2013/0216231 A1 | 8/2013 | Yang et al. | |
| 2014/0140360 A1* | 5/2014 | Nikopour | H04J 13/00 370/479 |
| 2014/0169409 A1 | 6/2014 | Ma et al. | |
| 2014/0185654 A1* | 7/2014 | Zhang | H04L 5/026 375/146 |
| 2014/0293987 A1 | 10/2014 | Zhu et al. | |
| 2014/0376524 A1 | 12/2014 | Kwak et al. | |
| 2015/0195840 A1 | 7/2015 | Ahn et al. | |
| 2016/0080060 A1* | 3/2016 | Yu | H04B 7/0626 455/452.2 |
| 2016/0254889 A1* | 9/2016 | Shattil | H04L 12/2854 370/329 |

FOREIGN PATENT DOCUMENTS

| | | |
|---|---|---|
| CN | 102273158 A | 12/2011 |
| CN | 103346993 A | 10/2013 |
| CN | 104320234 A | 1/2015 |
| CN | 104509152 A | 4/2015 |
| JP | 2010501146 A | 1/2010 |
| JP | 2010519879 A | 6/2010 |
| JP | 2014140256 A | 7/2014 |
| WO | 2008153350 A1 | 12/2008 |
| WO | WO2012140847 A1 | 10/2012 |
| WO | 2013163955 A1 | 11/2013 |
| WO | 2014090189 A1 | 6/2014 |
| WO | 2014144758 A1 | 9/2014 |

OTHER PUBLICATIONS

R.Hoshyar et al, "LDS-OFDM an efficient multiple access technique," 2010 IEEE 71st Vehicular Technology Conference, May 16-19, 2010, 5 pages.
Yang Dongkai et al.,"Linear Multi-user Detection Based on the Bridge Function for MC-CDMA Systems", Journal of Telemetry, Tracking and Command, vol. 30, No. 2, Mar. 2009, total 7 pages.
Xu Yingqi,"Research on Peak-to-Average Power Ratio in MC-CDMA System", Xidian University, Jan. 2010, total 10 pages.

* cited by examiner

MC-CDMA WITH LOW PEAK-TO-AVERAGE POWER RATIO MULTI-CARRIER WAVEFORM

CROSS-REFERENCE TO RELATED APPLICATION

This application claims the benefit of U.S. Provisional Patent Application No. 62/168,437 entitled "Systems and Methods for Partial Collision Multiple Access" filed May 29, 2015, and U.S. Provisional Patent Application No. 62/262,142 entitled "MC-CDMA With Low Peak-To-Average Power Ratio Multi-Carrier Waveform" filed on Dec. 2, 2015, the entire contents of which are incorporated herein by reference.

FIELD

The disclosure relates generally to Multi-Carrier Code Division Multiple Access (MC-CDMA) techniques for Orthogonal Frequency Division Multiplexing (OFDM), and in particular embodiments to methods and systems for OFDM using MC-CDMA with single-carrier Peak-to-Average Power Ratio (PAPR).

BACKGROUND

PAPR is an important consideration in waveform design for wireless communication. In Long Term Evolution (LTE) based wireless communication, Discrete Fourier Transform Spread OFDM (DFT-S-OFDM) has been adopted as the uplink multiple access scheme, mainly because it has lower PAPR than conventional OFDM. PAPR may be even more important in future networks that support massive connectivity, such as Machine-Type Communication (MTC), Machine-to-Machine (M2M), and the Internet of Things (IoT), where devices may have more power restrictions and may require long battery life.

DFT-S-OFDM is also called Single Carrier Frequency Division Multiple Access (SC-FDMA), because each DFT-spread sub-band signal uses a circularly convolved single carrier waveform. In other words, it is well known that a single carrier signal has a lower PAPR than a conventional OFDM signal, especially for lower order modulations.

This lower PAPR property of single carrier transmission has been further exploited by combining regular QAM modulation with subcarrier index modulation. The key elements of this kind of hybrid modulation are: 1) only one subcarrier carries QAM modulation, and 2) the rest of the information is carried by the subcarrier index of this active subcarrier.

The main motivation of this QAM/subcarrier-index hybrid modulation is to have a single carrier waveform, so as to achieve a low PAPR. To increase throughput, subcarrier-index modulation may be used. For example, given 4 subcarriers, the number of additional information bits that can be carried using subcarrier-index modulation is two. However, this scheme has a couple of drawbacks:
   Limited throughput: this is because subcarrier index modulation is inefficient from a spectral efficiency point of view, especially when the number of subcarriers is large, and this is why the number of subcarriers is usually limited to 4; and
   Lost spectral efficiency when SNR is high: this is because although the QAM order can be increased on the active subcarrier to carry more information, subcarrier index modulation is unable to take advantage of this high SNR, because it can only increase the modulation order on one active subcarrier.

Accordingly, there is a need for multiple access techniques with single-carrier PAPR that are efficient and can support high throughput.

SUMMARY

One aspect of the present disclosure provides a method for operating a device in a wireless network. In the method, the device spreads data with a spreading sequence to generate multi-carrier spread data on subcarriers corresponding to non-zero subcarrier elements of the spreading sequence and transmits the multi-carrier spread data. The spreading sequence has sparsity of non-zero subcarrier elements and an equal spacing between adjacent non-zero subcarrier elements. As a result, the waveform resulting from transmission of the multi-carrier spread data may have a PAPR comparable to that of conventional single carrier transmission.

The spreading sequence may be selected from multiple spreading sequences that each has a respective equal spacing between adjacent non-zero subcarrier elements. The spreading sequences of the plurality may differ from one another in at least one of: sparsity level in the frequency domain; sparsity pattern in the frequency domain; and pulse offset in the time domain. In some embodiments of the method, spreading data with a spreading sequence to generate multi-carrier spread data includes spreading multiple data symbols with respective spreading sequences selected from the multiple spreading sequences. For example, spreading multiple data symbols with respective spreading sequences may include spreading a first data symbol with a first spreading sequence, and spreading a second data symbol with a second spreading sequence, the first and second spreading sequences sharing a common sparsity pattern in the frequency domain and differing in pulse offset in the time domain.

In some embodiments, at least one non-zero subcarrier element in the spreading sequence used for spreading the data collides with one non-zero subcarrier element of at least one of the other spreading sequences among the multiple spreading sequences, and at least one other non-zero subcarrier element in the spreading sequence used for spreading the data is different from one non-zero subcarrier element of at least one of the other spreading sequences.

In some embodiments, the spreading sequence has a length corresponding to a number of subcarriers available in the wireless network.

In some embodiments, spreading data with a spreading sequence to generate multi-carrier spread data includes encoding binary data to generate a modulated data stream and mapping the modulated data stream onto non-zero subcarrier elements of the spreading sequence. For example, encoding the binary data to generate a modulated data stream may involve applying a Fourier transform to the binary data.

In some embodiments, transmitting the multi-carrier spread data includes transforming the multi-carrier spread data to a time domain signal and transmitting the time domain signal.

In some embodiments, a value of the non-zero subcarrier elements in the spreading sequence is equal to 1.

In some embodiments, the number of non-zero subcarrier elements in the spreading sequence is greater than 2.

In some embodiments, the method is implemented at user equipment (UE). For example, the method may be used by a UE for uplink random access.

Another aspect of the present disclosure provides a transmitter device that includes a spreader and a transmitter that are configured to provide the spreading and transmitting functionality of the foregoing method. For example, in some embodiments the spreader includes an encoder configured to encode binary data to generate a modulated data stream and a mapper configured to map the modulated data stream onto non-zero subcarrier elements of the spreading sequence.

Yet another aspect of the present disclosure provides a communication device configured to send data to a wireless network, the communication device including a transmitter according to the above aspect of the present disclosure.

Still another aspect of the present disclosure provides a method that includes assigning a first communication device a first spreading sequence for spreading data to generate first multi-carrier spread data on subcarriers corresponding to non-zero subcarrier elements of the first spreading sequence and assigning a second communication device a second spreading sequence for spreading data to generate second multi-carrier spread data on subcarriers corresponding to non-zero subcarrier elements of the second spreading sequence. The first spreading sequences having sparsity of non-zero subcarrier elements and a first equal spacing between adjacent non-zero subcarrier elements. The second spreading sequence having a second equal spacing between adjacent non-zero subcarrier elements. The first and second spreading sequences differing from one another in at least one of: sparsity level in the frequency domain; sparsity pattern in the frequency domain; and pulse offset in the time domain. In some embodiments, the first equal spacing and the second equal spacing are equal. In other embodiments, the first equal spacing and the second equal spacing are different.

In some embodiments, assigning a first spreading sequence to the first communication device involves assigning the first communication device one or more spreading sequences from a first group of spreading sequences to spread one or more data symbols, each spreading sequence in the first group sharing a common sparsity pattern in the frequency domain and differing in pulse offset in the time domain. In some such embodiments, assigning a second spreading sequence to the second communication device involves assigning the second communication device one or more spreading sequences from the first group to spread one or more data symbols. In other embodiments, the second communication device is assigned one or more spreading sequences from a second group of spreading sequences to spread one or more data symbols, each spreading sequence in the second group sharing a common sparsity pattern in the frequency domain and differing in pulse offset in the time domain, wherein the common sparsity pattern of the first group of spreading sequences is different from the common sparsity pattern of the second group of spreading sequences.

BRIEF DESCRIPTION OF THE DRAWINGS

Embodiments will now be described with reference to the accompanying drawings, in which.

Like reference numerals are used throughout the Figures to denote similar elements and features. While aspects of the disclosure will be described in conjunction with the illustrated embodiments, it will be understood that it is not intended to limit the disclosure to such embodiments.

DETAILED DESCRIPTION

As noted above, DFT-S-OFDM (or SC-FDMA) typically has lower PAPR than conventional OFDM. However, DFT-S-OFDM is unsuitable for MC-CDMA, because there is no mechanism in DFT-S-OFDM for mitigating signal collision between different devices.

The present disclosure describes methods, devices and systems for spreading and transmitting data in a wireless communications system such that the resulting waveforms that are transmitted have low PAPR and mitigate signal collisions between different devices. Complementary receiving and decoding methods, devices and systems are also illustrated along with methods for generating spreading sequences. In some embodiments, a more efficient use of wireless communication resources for multiple devices is thus provided.

One aspect of the present disclosure provides a new waveform, which is OFDM in nature, but has single carrier PAPR. In some cases, this new waveform may have one or more of the following properties:

Each communication device, such as mobile User Equipment (UE), can use multiple spreading sequences, while still having a low PAPR;

The spreading sequences can have a sparse or low density of non-zero subcarrier elements (e.g., 50% or fewer non-zero subcarrier elements), depending on throughput needs;

A pool of partial collision codebooks (in terms of both codewords/spreading sequences and signaling pulse) can be used to mitigate the effect of device codebook collision and increase the number of random access devices.

Figure 1:
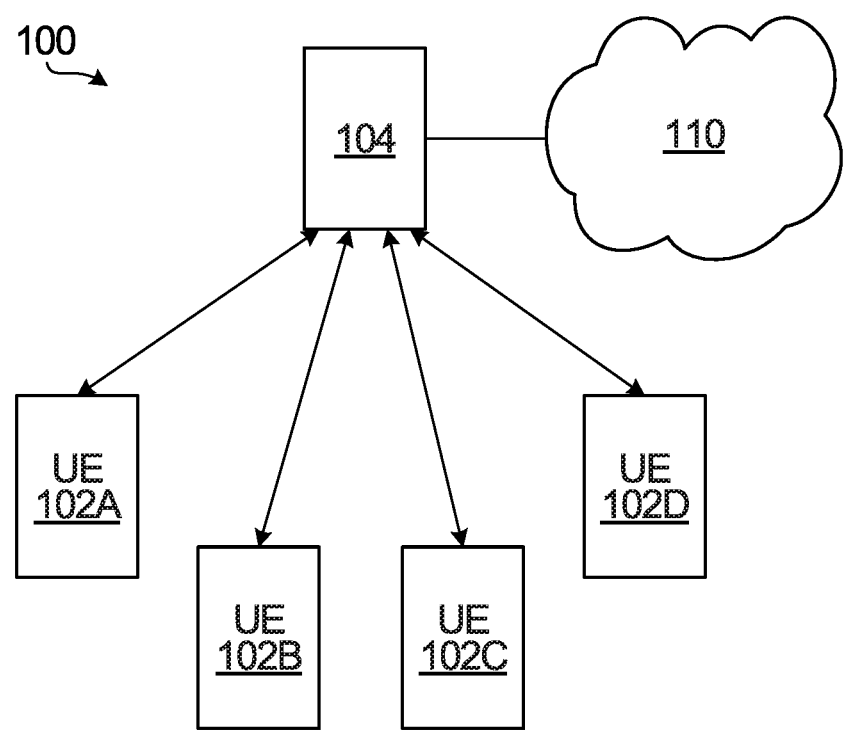
FIG. 1 is a block diagram of a communications network according to an embodiment of the present disclosure.

FIG. 1 illustrates a communications network 100 comprising multiple user devices 102A, 102B, 102C, 102D and a network node 104. The network 100 may operate according to one or more communications or data standards or technologies including but not limited to fourth generation (4G) telecommunications networks such as Long-Term Evolution (LTE) networks, Universal Mobile Telecommunications System (UMTS) and other wireless or mobile communications networks. The user devices 102, sometimes known as user equipment (UEs), are generally any device capable of providing wireless communications such as a wireless transmit/receive unit (WTRU), mobile station (MS), smartphone, cellular telephone, sensor, or other wireless enabled computing or mobile device. In some embodiments, the user devices 102 comprise machines which perform other primary functions and have the capability to send, receive, or send and receive data in the communications network 100. In one embodiment, a machine includes an apparatus or device with means to transmit and/or receive data through the communications network 100 but such apparatus or device is not typically operated by a user for the primary purpose of communications. It will be appreciated that the systems and methods described herein also may be applied to other low data rate transmission scenarios or applications and devices operating with unscheduled data transmissions. The network node 104 may comprise a base station (BS), evolved Node B (eNB), access point (AP), or other network interface which functions as a transmission and/or reception point for user devices 102 in the network 100. The network node 104 is connected to a backhaul network 110 which enables data to be exchanged between the network node 104 and other remote networks, nodes and devices (not shown).

Figure 2:
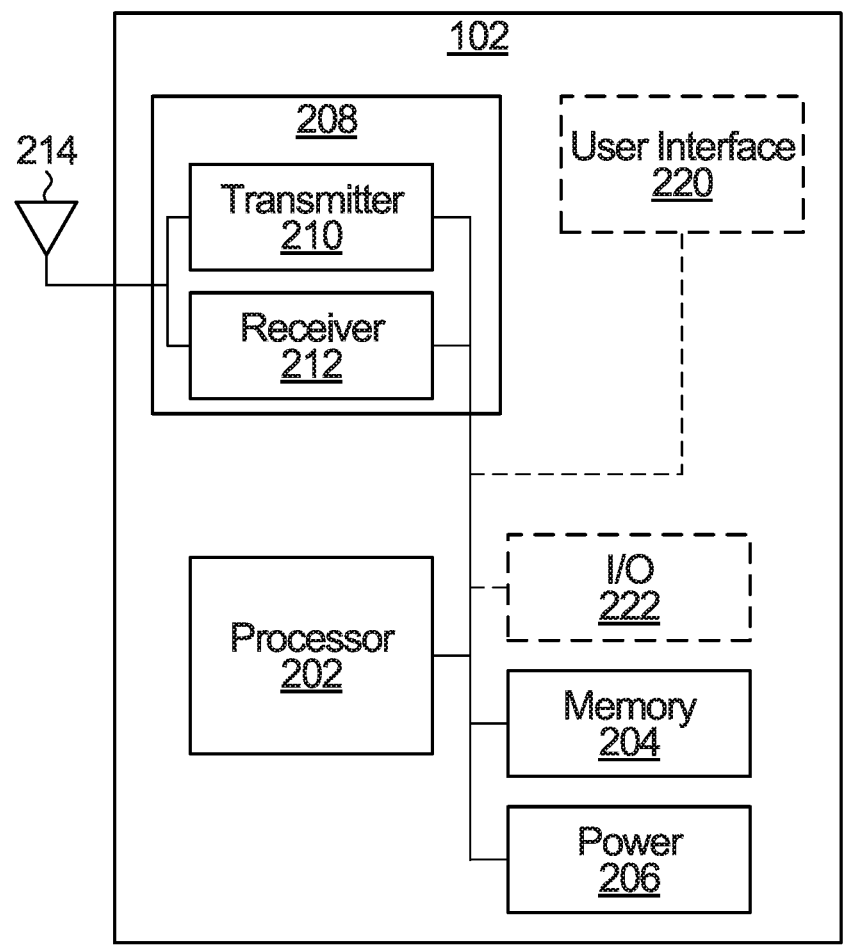
FIG. 2 is a block diagram of a user device according to an embodiment of the present disclosure.

FIG. 2 shows one embodiment of a user device 102 for implementing the methods and modules described herein. The device 102 may include a processor 202, a memory 204, a power source 206 and a wireless communications interface 208 for sending and receiving data in the communications network 100, which components may or may not be arranged as shown in FIG. 2. The wireless communications interface 208 includes a transmitter 210 and a receiver 212 coupled to an antenna 214. It will be appreciated that the functions of the wireless communications interface 208 may be carried out by different transceiver or modem components including multiple transmitter, receiver, digital signal processor (DSP) and antenna components or arrays. In one embodiment, the user device 102 includes a user interface 220 and various inputs/outputs (I/O) 222 such as a display, audio input, audio output, keypads, buttons, microphones or other inputs or outputs. The memory 204 may store programming and/or instructions for the processor 202 including instructions for sending, receiving, processing and supporting different services and types of data, such as but not limited to video, VoIP calls, web browsing data, email and other text communications.

Figure 3:
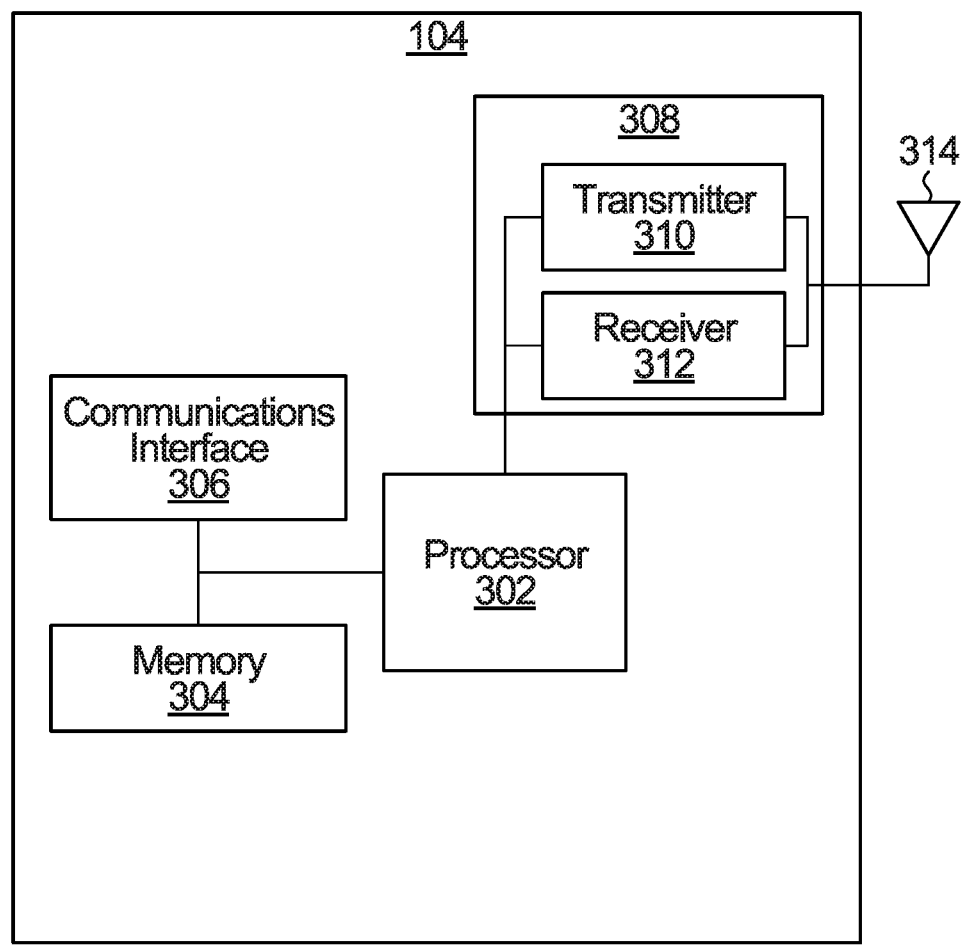
FIG. 3 is a block diagram of a network node according to an embodiment of the present disclosure.

FIG. 3 illustrates a network node 104 according to an embodiment of the present application. The network node 104 may comprise a processor 302, a memory 304, one or more communications interfaces 306, 308. The communications interface 306 may be a wired or wireless interface for sending and receiving data to the backhaul network 110 or to other network nodes, gateways or relays (not shown) in the network 100. The wireless communications interface 308 is configured to send and receive data with one or more user devices 102 according to the multiple access system described herein. It will be appreciated that the functions of the wireless communications interface 308 may be carried out by different transceiver or modem components including multiple transmitter, receiver and antenna components or arrays. The memory 304 may store programming and/or instructions for the processor 302, including instructions for sending and receiving data to and from a user device 102. The network node 104 may be configured to schedule data transmissions among the user devices 102 or it may be configured to support unscheduled data transmissions from the user devices 102.

Each user device 102 is configured to transmit data by modulating and spreading the data in accordance with predefined constellation maps and an assigned spreading sequence. The spreading sequences may be pre-assigned to a group of user devices 102 in the network 100 by the network node 104 or by another management or scheduling entity (not shown) in the network 100. The assignment of spreading sequences may occur through dynamic or semi-static signalling. Each user device 102 uses its assigned spreading sequence to access the network 100 and transmit data to the network node 104. For example, the assigned spreading sequences may be used by the user devices for uplink random access. The assigned spreading sequences are known to the network node 104 and used to decode the received data. In one embodiment, a complementary allocation and use of spreading sequences occurs for the transmission of data from the network node 104 to the user devices 102.

One variant of MC-CDMA is low-density signature OFDM (LDS-OFDM), where the sequences used in MC-CDMA are sparse so that a message passing algorithm (MPA) can be used for multiuser decoding (MUD), which can simplify the complexity of a receiver.

One design consideration of LDS-OFDM is to minimize the number of colliding signals on each subcarrier. The primary motivation of this consideration is to reduce receiver complexity, but it also minimizes inter-sequence interference, which is desirable from the system performance point of view. Although LDS-OFDM is a non-orthogonal system by nature, maximizing sequence orthogonality is generally a design objective.

To achieve the PAPR of a single carrier signal, a transmitted signal must have a time domain pulse at every signaling instant. For a conventional single carrier signal, different information is carried on each pulse. However, for LDS-OFDM, due to frequency domain sparsity, each time domain pulse does not necessarily carry unique information. In other words, some repetition in the time domain pulses is needed so that there is a pulse at every signaling instant. As will be seen below, this repetition may be achieved in accordance with one example embodiment through the use of a sparse spreading sequence with an equal spacing between adjacent non-zero subcarrier elements.

Figure 4:
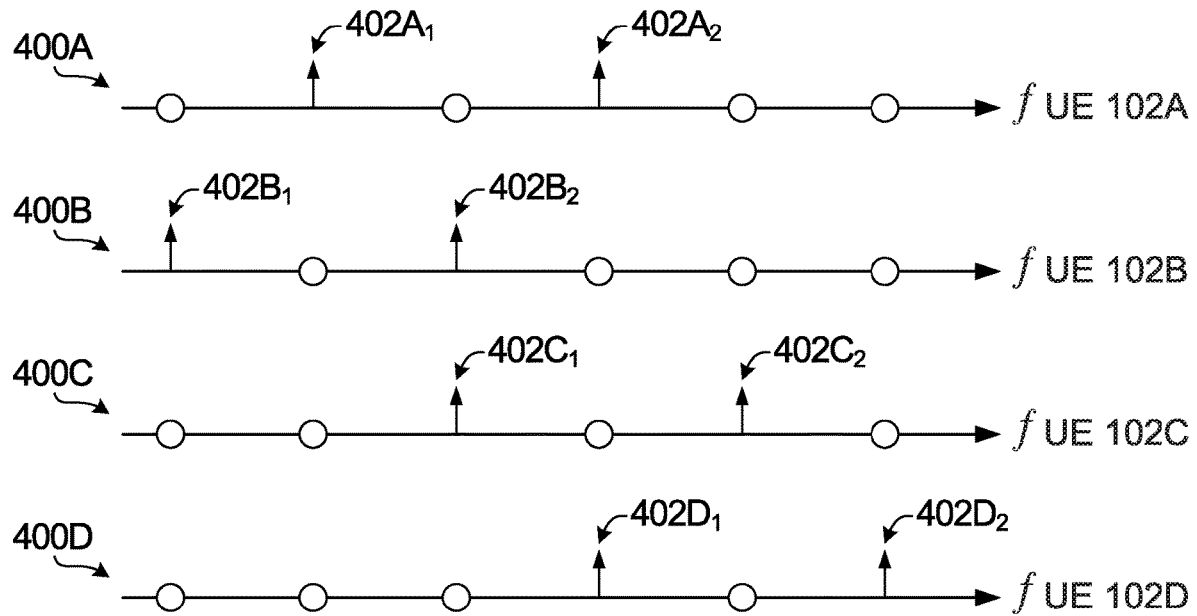
FIG. 4 shows frequency domain plots of low-density signature OFDM (LDS-OFDM) waveforms with single carrier PAPR according to an embodiment of the present disclosure.

FIG. 4 shows the concept of LDS-OFDM with single carrier PAPR in accordance with an example embodiment of the present disclosure for four UEs 102A, 102B, 102C and 102D. In particular, FIG. 4 shows frequency domain spreading sequences 400A, 400B, 400C and 400D for UEs 102A, 102B, 102C and 102D, respectively. Each of the spreading sequences 400A, 400B, 400C and 400D has six subcarrier elements. In each spreading sequence 400A, 400B, 400C, 400D, two of the six subcarrier elements are non-zero. In particular, spreading sequence 400A has non-zero subcarrier elements $402A_1$ and $402A_2$ on the second and fourth subcarriers, spreading sequence 400B has non-zero subcarrier elements $402B_1$ and $402B_2$ on the first and third subcarriers, spreading sequence 400C has non-zero subcarrier elements $402C_1$ and $402C_2$ on the third and fifth subcarriers, and spreading sequence 400D has non-zero subcarrier elements $402D_1$ and $402D_2$ on the fourth and sixth subcarriers. As depicted in FIG. 4, the spreading sequence 400A for UE 102A partially collides with the spreading sequence 400D for UE 102D, because the non-zero subcarrier element $402A_2$ overlaps the non-zero subcarrier element $402D_1$ on the fourth subcarrier.

Similarly, the spreading sequence 400B for UE 102B partially collides with the spreading sequence 400C for UE 102C, because the non-zero subcarrier element $402B_2$ overlaps the non-zero subcarrier element $402C_1$ on the third subcarrier. A collision will be understood to occur where multiple user devices 102 are transmitting data using the same or overlapping subcarriers. The collisions between the spreading sequences depicted in FIG. 4 are partial collisions, because the spreading sequences collide on less than all of their non-zero subcarrier elements.

One difference between the waveforms shown in FIG. 4 and a conventional single carrier waveform is that the sparsity in the frequency domain corresponds to pulse repetition in the time domain, which ensures low PAPR of the resulting signals.

To simplify the discussion, we define rotated DFT (R-DFT) as follows. Let $W_L^{(i)}$ be the $i^{th}$ L×L R-DFT matrix, with $$w_{k,n}^{(i)} = \exp\left(j2\pi k\left(\frac{n}{L} + \frac{i}{N}\right)\right), \quad (1)$$

where i is the rotation index, $0 \leq i \leq N/L-1$, $w_{k,n}^{(i)}$ is the "k th row/n th column" element of $W_L^{(i)}$, L is the size of the R-DFT matrix, and (N/L−1) defines the total number of rotation indexes. For example, with L=2 and N=4, equation (1) results in:

$$W_2^{(0)} = \begin{bmatrix} 1 & 1 \\ 1 & -1 \end{bmatrix}, W_2^{(1)} = \begin{bmatrix} 1 & 1 \\ j & -j \end{bmatrix},$$

where $W_2^{(0)}$, i.e., i=0, is the conventional DFT matrix and $W_2^{(1)}$, i.e., i=1, is a rotated DFT matrix. Here, the rotation matrix Q that transforms $W_2^{(0)}$ to $W_2^{(1)}$, i.e. $Q \times W_2^{(0)} =$ $$W_2^{(1)}, \text{ is } Q = \begin{bmatrix} 1 & 0 \\ 0 & j \end{bmatrix}.$$

Each column of the two DFT matrices $W_2^{(0)}$ and $W_2^{(1)}$ represents a sequence. By mapping these columns/sequences to subcarrier elements, spreading sequences can be obtained. For example, by mapping the sequences to the $1^{st}$ and $3^{rd}$ subcarrier elements of a low density spreading sequence with a length of four subcarriers (K=4), the following four spreading sequences are obtained:

[1 0 1 0], [1 0 −1 0], [1 0 j 0], [1 0 −j 0].

In DFT-S-OFDM, each QAM modulated data symbol is spread with the columns of $W^{(0)}$. It can be seen that due to the rotation of the DFT matrices, columns from $W^{(i)}$ of different i are not fully correlated. Thus, although the four sequences listed above may collide on two elements, the sequences only partially collide due to the values of the sequences, which correspond to partially offset pulses in the time domain. This property helps create a more random minimum mean-square error (MMSE) processing matrix at the receiver for signal detection. In some embodiments of the present disclosure, DFT values such as those examples described above are mapped to spreading sequence subcarrier elements to generate spreading sequences to provide DFT spread multi-carrier CDMA (DFT-S-MC-CDMA) signals with single carrier PAPR.

Figure 5:
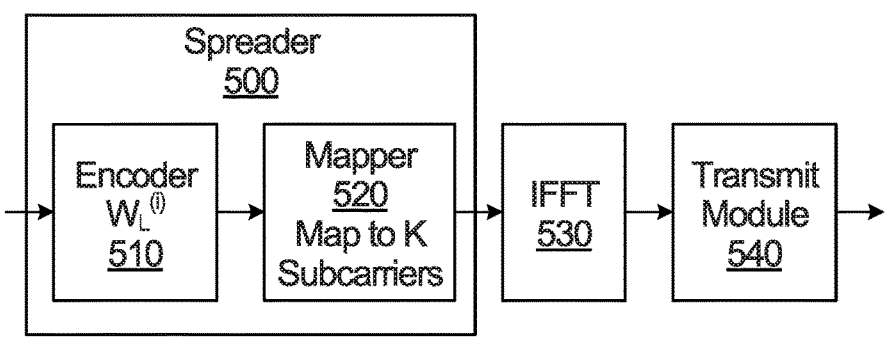
FIG. 5 is a block diagram illustrating a spreader according to an embodiment of the present disclosure.

FIG. 5 illustrates a block diagram of a spreader 500 configured for DFT-S-MC-CDMA in accordance with an embodiment of the present disclosure. The spreader 500 may be for use in encoding and transmitting data from a user device 102, or from a network node 104. The spreader 500 is configured to receive data for transmission and spread the data with a spreading sequence to generate multi-carrier spread data. The spreader 500 may include an encoder 510 configured to encode binary data to generate a modulated data stream, and a mapper 520 configured to map the modulated data stream onto non-zero subcarrier elements of a spreading sequence. In one embodiment, the encoder 510 is configured to apply the column values of the $i^{th}$ L×L R-DFT matrix $W_L^{(i)}$ to the received data to generate L DFT output values, and the mapper 520 is configured to map the L DFT output values onto K subcarriers to generate a spreading sequence of length K. In order to provide single carrier PAPR, the mapping of the L DFT output values onto K subcarriers must be done such that there is an equal spacing between non-zero subcarrier elements in the spreading sequence.

The multi-carrier spread data sequences may then be transformed into a time domain signal by an inverse fast fourier transform (IFFT) module 530 and transmitted through a wireless medium by a transmit module 540 which may implement additional functions such as pulse shaping and subcarrier modulation.

Although shown as separate modules, it will be appreciated that the encoder and mapper modules 510, 520 may be implemented as one component in hardware, or in software, or in a combination thereof. The modules 510, 520 may be part of the communications interface 208, 308 or executed by the processor 202, 302 in the device 102 or network node 104.

Adapt Per UE Throughput

In conventional MC-CDMA, throughput can be increased by using more than one spreading sequence. Even with each spreading sequence being designed to have low PAPR, using multiple sequences at the same time in conventional MC-CDMA will increase the overall PAPR. However, with the MC-CDMA techniques disclosed herein, multiple QAM signals can be transmitted simultaneously, with a PAPR comparable to that of conventional single carrier transmission.

As noted above, the mapper 520 is configured to map the L DFT output values onto K subcarriers to generate a spreading sequence of length K. By adjusting the size of the DFT, i.e., by adjusting L, the throughput of the device can be adjusted, because adjusting L changes the sparsity level of the spreading sequence. The maximum throughput is achieved by setting L=K.

UE Multiplexing

Uplink (UL) MC-CDMA is non-orthogonal in a frequency selective channel, even when the spreading codes used by UEs are orthogonal. LDS-OFDM further relaxes this condition of orthogonality by employing partial collision spreading codes.

In future wireless networks, to save signaling overhead, many devices may access an UL resource without scheduling, which implies potential sequence collision. However, due to frequency selectivity, colliding sequences that may have been completely correlated prior to transmission may no longer be completely correlated. In addition, with received signal power differences and successive interference cancellation (SIC), even with an MMSE decoder, it may still be possible to successfully detect UE signals even in the case of sequence collision.

Nonetheless, from the signal spreading sequence design point of view, it is generally preferable to minimize the maximum correlation among sequences, to reduce reliance on channel variation and received signal power differences to mitigate the effects of sequence collisions. In addition, the larger the sequence pool, the smaller the probability of sequence collision.

According to some embodiments, a large pool of partial collision sequences can be designed. In some embodiments, one or more of the following parameters of the sequence pool may be configurable:

Sparsity level—UEs with different throughput may use spreading sequences of different sparsity level, which corresponds to repetition level in the time domain;

Sparsity pattern (frequency domain)—manifested as non-zero subcarrier element collision in the frequency domain; and Pulse offset (time domain)—manifested as pulse offsets in the time domain.

Any difference between spreading sequences in any of the above dimensions will change the collision level between the sequences. Examples of spreading sequences that differ in one or more of the above dimensions are discussed below with reference to FIGS. 6 to 8.

Sparsity Level

Figure 6:
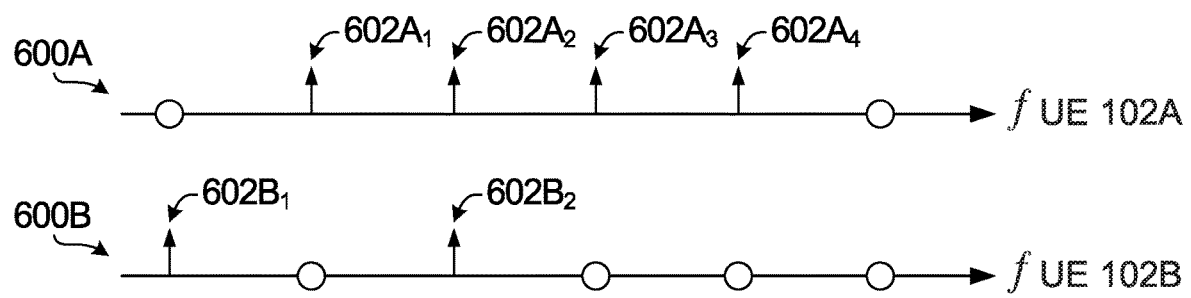
FIG. 6 shows frequency domain plots of two spreading sequences having different sparsity levels according to an embodiment of the present disclosure.

Different user devices can use spreading sequences with different sparsity levels. For example, FIG. 6 shows frequency domain spreading sequences 600A and 600B having different sparsity levels for two UEs 102A and 102B according to an embodiment of the present disclosure. Each of the spreading sequences 600A, 600B has six subcarrier elements. However, spreading sequence 600A has four non-zero subcarrier elements $602A_1$, $602A_2$, $602A_3$, and $602A_4$ on the second through fifth subcarriers, and spreading sequence 600B has two non-zero subcarrier elements $602B_1$ and $602B_2$ on the first and third subcarriers. As such, the spreading sequence 600A for UE 102A has twice the number of non-zero subcarriers as the spreading sequence 600B for UE 102B, and hence UE 102A can potentially have double the throughput of UE 102B. The spreading sequences 600A and 600B both provide single carrier PAPR, because the spacing between adjacent non-zero subcarrier elements in both spreading sequences is constant, although the equal spacing between the non-zero subcarrier elements $602A_1$, $602A_2$, $602A_3$ and $602A_4$ of spreading sequence 600A is different from the equal spacing between the non-zero subcarrier elements $602B_1$ and $602B_2$ of spreading sequence 600B. In particular, the non-zero subcarrier elements $602A_1$, $602A_2$, $602A_3$ and $602A_4$ are mapped to immediately adjacent subcarriers in spreading sequence 600A and the non-zero subcarrier elements $602B_1$ and $602B_2$ are mapped to subcarriers that are separated by one intervening subcarrier. In other embodiments, spreading sequences with different sparsity levels may have the same equal spacing between their non-zero subcarrier elements. The spreading sequence 600A for UE 102A partially collides with the spreading sequence 600B for UE 102B, because the non-zero subcarrier elements $602A_2$ and $60B_2$ overlap on the third subcarrier. Because the collision between the spreading sequences 600A and 600B is only partial, a receiver may still be able to receive and decode data spread and transmitted by UEs 102A and 102B using the spreading sequences 600A and 600B.

Sparsity Pattern

Figure 7:
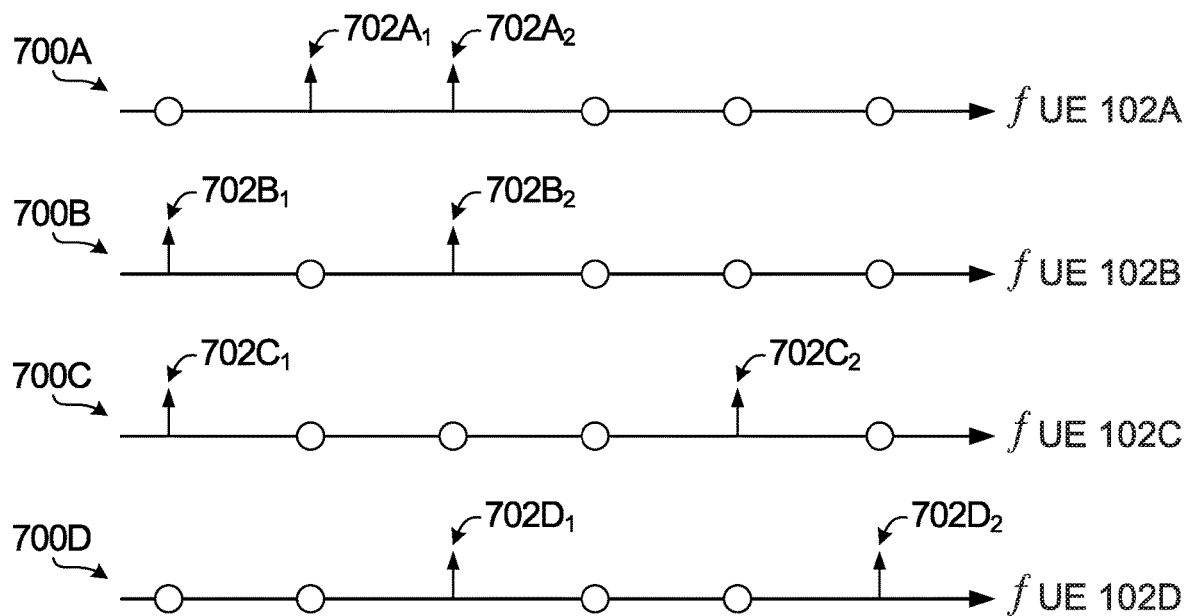
FIG. 7 shows frequency domain plots of four spreading sequences having different sparsity patterns according to an embodiment of the present disclosure.

Even with the same number of non-zero subcarrier elements, different UEs can be assigned spreading sequences with different sparsity patterns. For example, FIG. 7 shows frequency domain spreading sequences 700A, 700B, 700C and 700D having different sparsity patterns for four UEs 102A, 102B, 102C and 102D according to an embodiment of the present disclosure. In this example, each of the spreading sequences has six subcarrier elements and has the same sparsity level, i.e., each spreading sequence has two non-zero subcarrier elements. In particular, spreading sequence 700A has non-zero subcarrier elements $702A_1$ and $702A_2$ on the second and third subcarriers, spreading sequence 700B has non-zero subcarrier elements $702B_1$ and $702B_2$ on the first and third subcarriers, spreading sequence 700C has non-zero subcarrier elements $702C_1$ and $702C_2$ on the first and fifth subcarriers, and spreading sequence 700D has non-zero subcarrier elements $702D_1$ and $702D_2$ on the third and sixth subcarriers. The spreading sequences 700A, 700B, 700C and 700D provide single carrier PAPR. Similarly to the spreading sequences 600A and 600B depicted in FIG. 6, the spreading sequences 700A, 700B, 700C and 700D depicted in FIG. 7 each have a different spacing between their non-zero subcarrier elements. For example, the non-zero subcarrier elements $702B_1$ and $702B_2$ of spreading sequence 700B are separated by one intervening null subcarrier element and the non-zero subcarrier elements $702C_1$ and $702C_2$ are separated by three null subcarrier elements. As depicted in FIG. 7, the spreading sequence 700A for UE 102A, the spreading sequence 700B for UE 102B, and the spreading sequence 700D for UE 102D partially collide, because the non-zero subcarrier elements $702A_2$, $702B_2$ and $702D_1$ overlap on the third subcarrier. Similarly, the spreading sequence 700B for UE 102B partially collides with the spreading sequence 700C for UE 102C, because the non-zero subcarrier elements $702B_1$ and $702C_1$ overlap on the first subcarrier. Because collisions between the spreading sequences 700A, 700B, 700C and 700D are only partial, a receiver may still be able to receive and decode data spread and transmitted by UEs 102A, 102B, 102C, and 102D using the spreading sequences 700A, 700B, 700C and 700D.

Pulse Offset

Figure 8:
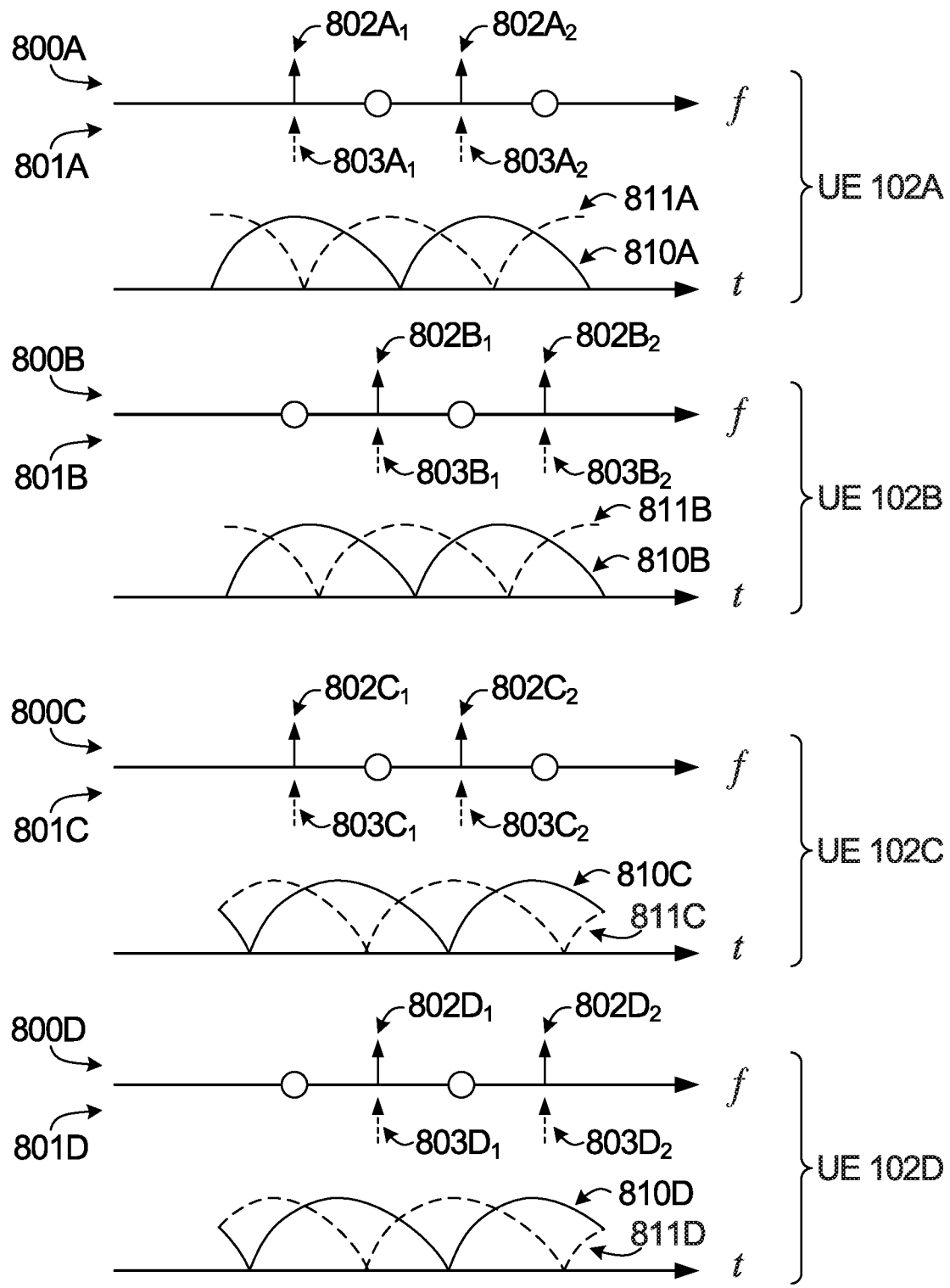
FIG. 8 shows frequency domain and time domain plots of eight spreading sequences having different sparsity patterns and/or time domain pulse offsets for multi-sequence transmission according to an embodiment of the present disclosure.

Even with the same sparsity level and pattern, the partial collision properties of sequences may be achieved by using sequence values corresponding to partially offset pulses in the time domain. As discussed above, pulse offset can be achieved through DFT matrix rotation, because the columns from $W^{(i)}$ of different rotation index i are not fully correlated, and pulses created by different rotation indexes have different cyclic offsets in the time domain. FIG. 8 shows frequency domain and time domain plots of eight spreading sequences 800A, 801A, 800B, 801B, 800C, 801C, 800D and 801D having different sparsity patterns and/or time domain pulse offsets for multi-sequence transmission by four UEs 102A, 102B, 102C and 102D according to an embodiment of the present disclosure. Each of the UEs 102A, 102B, 102C and 102D is assigned two of the spreading sequences. In this example, each of the spreading sequences has four subcarrier elements and has the same sparsity level, i.e., each spreading sequence has two non-zero subcarrier elements. The spreading sequences 800A and 801A assigned to UE 102A and the spreading sequences 800C and 801C assigned to UE 102C share a common sparsity pattern with a first non-zero subcarrier element ($802A_1$, $803A_1$, $802C_1$ and $803C_1$, respectively) on the first subcarrier and a second non-zero subcarrier element ($802A_2$, $803A_2$, $802C_2$ and $803C_2$, respectively) on the third subcarrier.

The spreading sequences 800B and 801B assigned to UE 102B and the spreading sequences 800D and 801D assigned to UE 102D share a common sparsity pattern that is different from the sparsity pattern shared by the spreading sequences 800A, 801A, 800C and 801C. In particular, the spreading sequences 800B, 801B, 800D and 801D each have a first non-zero subcarrier element (802B$_1$, 803B$_1$, 802D$_1$ and 803D$_1$, respectively) on the second subcarrier and a second non-zero subcarrier element (802B$_2$, 803B$_2$, 802D$_2$ and 803D$_2$, respectively) on the fourth subcarrier.

As depicted in FIG. 8, the eight spreading sequences 800A, 801A, 800B, 801B, 800C, 801C, 800D and 801D are configured so that each subcarrier has four non-zero subcarrier elements mapped onto it. In this embodiment, these collisions are only partial because the non-zero subcarrier element values of the spreading sequences are configured to provide a pulse offset in the time domain. For example, the non-zero subcarrier elements of the spreading sequences 800A, 801A, 800C and 801C may be configured with the column values of the two R-DFT matrices $W_2^{(0)}$ and $W_2^{(1)}$ described above such that:

spreading sequence 800A=[1 0 1 0],
spreading sequence 801A=[1 0 −1 0],
spreading sequence 800C=[1 0 j 0],
spreading sequence 801C=[1 0 −j 0].

By using the above subcarrier element values, the two spreading sequences 800A and 801A assigned to UE 102A have a phase rotation relative to one another and also have a phase rotation relative to the two spreading sequences 800C and 801C assigned to UE 102C, which in turn have a phase rotation relative to one another. This relative phase rotation produces time offsets between the time domain pulses 810A and 811A for UE 102A and the time domain pulses 810C and 811C for UE 102C even though the spreading sequences 800A, 801A, 800C and 801C overlap in the frequency domain.

Similarly, the column values of the two R-DFT matrices $W_2^{(0)}$ and $W_2^{(1)}$ can be mapped to the non-zero elements of the spreading sequences 800B, 801B, 800C and 801C such that:

spreading sequence 800B=[0 1 0 1],
spreading sequence 801B=[0 1 0 −1],
spreading sequence 800D=[0 1 0 j],
spreading sequence 801D=[0 1 0 −j].

Here again, the relative phase rotation between the spreading sequences 800B, 801B, 800D and 801D produces time offsets between the time domain pulses 810B and 811B for UE 102B and the time domain pulses 810D and 811D for UE 102D even though the spreading sequences 800B, 801B, 800D and 801D overlap in the frequency domain.

In this example, four spreading sequences of length four (K=4) have been generated for two sparsity patterns. The non-zero subcarrier element values are based on the column values of R-DFT matrices, so that the resulting spreading sequences that share a common sparsity pattern have different pulse offsets in the time domain. More generally, any number of different sparsity patterns may be defined, such as those examples depicted in FIG. 7, and each sparsity pattern may be considered as corresponding to a codebook. Each codebook consists of multiple spreading sequences (or codewords) which are generated from different pulse offsets (phase rotations in the frequency domain) by assigning the non-zero subcarrier elements of the spreading sequences values corresponding to the column values of R-DFT matrices.

As another example, for a codebook of eight spreading sequences with two non-zero subcarrier elements per sequence, (L=2 and N=8), equation (1) results in the following four R-DFT matrices:

$$W_2^{(0)} = \begin{bmatrix} 1 & 1 \\ 1 & -1 \end{bmatrix},$$

$$W_2^{(1)} = \begin{bmatrix} 1 & 1 \\ \sqrt{2}/2 + j\sqrt{2}/2 & -(\sqrt{2}/2 + j\sqrt{2}/2) \end{bmatrix},$$

$$W_2^{(2)} = \begin{bmatrix} 1 & 1 \\ j & -j \end{bmatrix},$$

$$W_2^{(3)} = \begin{bmatrix} 1 & 1 \\ -\sqrt{2}/2 + j\sqrt{2}/2 & \sqrt{2}/2 - j\sqrt{2}/2 \end{bmatrix}.$$

Mapping the columns/sequences from the above four R-DFT matrices to the $2^{nd}$ and $4^{th}$ subcarrier elements of a low density spreading sequence with a length of four subcarriers (K=4), the following eight spreading sequences are obtained:

[0 1 0 1], [0 1 0 −1],

[0 1 0 j], [0 1 0 −j],

[0 1 0 $\sqrt{2}/2 + j\sqrt{2}/2$],

[0 1 0 $-\sqrt{2}/2 - j\sqrt{2}/2$],

[0 1 0 $-\sqrt{2}/2 + j\sqrt{2}/2$],

[0 1 0 $\sqrt{2}/2 - j\sqrt{2}/2$].

The foregoing examples of spreading sequences based on R-DFT matrices have two non-zero subcarrier elements, i.e. they are based on R-DFT matrices where L=2. However, other embodiments of the present disclosure provide spreading sequences with greater than two non-zero subcarrier elements. For example, by setting L=3 and N=6, equation (1) results in:

$$W_3^{(0)} = \begin{bmatrix} 1 & 1 & 1 \\ 1 & -1/2 + j\sqrt{3}/2 & -1/2 - j\sqrt{3}/2 \\ 1 & -1/2 - j\sqrt{3}/2 & -1/2 + j\sqrt{3}/2 \end{bmatrix}$$

$$W_3^{(1)} = \begin{bmatrix} 1 & 1 & 1 \\ 1/2 + j\sqrt{3}/2 & -1 & 1/2 - j\sqrt{3}/2 \\ -1/2 + j\sqrt{3}/2 & 1 & -1/2 - j\sqrt{3}/2 \end{bmatrix}.$$

Mapping the three elements in the six columns of $W_3^{(0)}$ and $W_3^{(1)}$ to the $1^{st}$, $3^{rd}$ and $5^{th}$ subcarrier elements of a low density spreading sequence with a length of six subcarriers (K=6), the following six spreading sequences are obtained:

[1 0 1 0 1 0],

[1 0 $-1/2 + j\sqrt{3}/2$ 0 $-1/2 - j\sqrt{3}/2$ 0],

[1 0 $-1/2 - j\sqrt{3}/2$ 0 $-1/2 + j\sqrt{3}/2$ 0],

[1 0 $1/2 + j\sqrt{3}/2$ 0 $-1/2 + j\sqrt{3}/2$ 0],

[1 0 −1 0 1 0],

[1 0 $1/2 - j\sqrt{3}/2$ 0 $-1/2 - j\sqrt{3}/2$ 0].

The codewords in a codebook can be used by a single UE to enhance date rate or used by different UEs to support a greater number of connected UEs. For example, a codebook that includes spreading sequences 800A, 801A, 800C and 801C allows UEs 102A and 102C to both be supported on the first and third subcarriers. Assigning each of the UEs 102A and 102C two of the spreading sequences can potentially double the data rate of UEs 102A and 102C.

The example spreading sequences shown in FIGS. 4 and 6 to 8 include 4 or 6 subcarrier elements. More generally, spreading sequences may include 4 or more subcarrier elements. For example, in some embodiments spreading sequences may include 8 subcarrier elements, 16 subcarrier elements, or even more. Furthermore, different UEs may use spreading sequences of different lengths. For example, some UEs may use spreading sequences with a length of 16 subcarrier elements to support high throughput, and other UEs may use spreading sequences with a length of 8 subcarrier elements.

Receiver Detection

One of the applications contemplated for the MC-CDMA techniques disclosed herein is in uplink random access. In uplink random access, different user devices 102 can access the same radio resource at the same time. In one embodiment, data transmitted by a user device 102 in accordance with the MC-CDMA transmission scheme disclosed herein may be received and decoded by the network node 104. The network node 104 may receive multiple data transmissions from different devices 102, each of which is transmitting data according to its assigned spreading sequence(s). With the MC-CDMA transmission scheme disclosed herein, if the network load is light or moderate, the received data may be decoded using a successive interference cancellation (SIC) decoding. If the network load is high, other decoding schemes such as MPA or MMSE may be used.

In some embodiments, a receiver may perform the following functions for signal detection:
1) On subcarriers with collision, an MMSE receiver or an MPA receiver may be used;
2) IDFT de-spreading, QAM de-mapping, and FEC decoding may then be used to decode transmissions;
3) SIC may be used to remove successfully decoded transmissions, and then steps 1) and 2) are repeated for remaining transmissions.

It will be appreciated from FIG. 7, for example, that the receiver of the network node 104 may first decode the data element on the fifth subcarrier of the signal associated with spreading sequence 700C because, in this example, no other data elements are transmitted on this subcarrier. Once this data element is known, the data element on the first subcarrier of the signal associated with spreading sequence 700C is also known, because the same data element is spread to the two non-zero subcarrier elements $702C_1$ and $702C_2$ of spreading sequence 700C. As shown in FIG. 7, the signal associated with spreading sequence 700B also has a data element on the first subcarrier. Because the data element on the first subcarrier of the signal associated with spreading sequence 700C has been determined, its interference effect can be removed. Once the interference effect of the colliding element on the first subcarrier of the signal associated with spreading sequence 700C has been removed, further decoding of the data element on the first subcarrier of the signal associated with spreading sequence 700B may then occur. In this way, when the partial collision spreading sequences 700B and 700C are used by two different UEs, successfully decoding the data elements of the signal associated with spreading sequence 700C and then removing the interference caused by the partial collision of the two spreading sequences, can improve the likelihood of successfully decoding the data elements of the signal associated with spreading sequence 700B. It will be appreciated that other factors such as, but not limited to, received power may be used to determine the SIC decoding order.

In some embodiments, the network node 104 may apply a combination of MMSE and SIC decoding in order to receive and decode partially collided data sequences. In the example illustrated in FIG. 7, an MMSE decoder may be used to decode the data element on the first subcarrier of the signal associated with spreading sequence 700C which collides with the data element on the first subcarrier of the signal associated with spreading sequence 700B. That result may be combined with the result for the data element on the fifth subcarrier of the signal associated with spreading sequence 700C (which is collision free) to improve the decoder's capability. Thus, MMSE decoding may be applied to the signals having the least collisions with other user signals. With the use of SIC and the interlaced structure of spreading sequences due to the partial collision sequence design, each successful decoding of one signal may simplify the decoding of the other undecoded signals.

MMSE with SIC can be implemented in a system with multiple receive antennas. In such embodiments, the system operates as a Multiple-User Multiple-Input and Multiple-Output (MU-MIMO)/DFT-S-OFDM system, with DFT-spread signals being sparsely mapped to an access resource block, and thus randomizing the inter-user collision.

Numerous modifications and variations of the present disclosure are possible in light of the above teachings. It is therefore to be understood that within the scope of the appended claims, the disclosure may be practiced otherwise than as specifically described herein.

In addition, although described primarily in the context of methods, apparatus and equipment, other implementations are also contemplated, such as in the form of instructions stored on a non-transitory computer-readable medium, for example.

The invention claimed is:
1. A method in a wireless network, the method comprising:
spreading data with a spreading sequence at a first device to generate multi-carrier spread data on subcarriers corresponding to non-zero subcarrier elements of the spreading sequence, the spreading sequence having sparsity of non-zero subcarrier elements and an equal spacing between adjacent non-zero subcarrier elements; and
transmitting the multi-carrier spread data to a second device over a communication channel,
wherein the spreading sequence is selected from a plurality of spreading sequences, each spreading sequence of the plurality having a respective equal spacing between adjacent non-zero subcarrier elements, the spreading sequences of the plurality differing from one another in at least one of:
sparsity level in a frequency domain, the sparsity level corresponding to a repetition level in a time domain; and
sparsity pattern in the frequency domain, the sparsity pattern being manifested as non-zero subcarrier element collision in the frequency domain,
at least two of the spreading sequences of the plurality of spreading sequences having different sparsity levels in the frequency domain.
2. The method of claim 1, wherein spreading data with a spreading sequence to generate multi-carrier spread data comprises spreading each of a plurality of data symbols with a respective spreading sequence from the plurality of spreading sequences.

3. The method of claim 1, wherein at least one non-zero subcarrier element in the spreading sequence used for spreading the data collides with one non-zero subcarrier element of at least one other spreading sequence in the plurality of spreading sequences, and at least one other non-zero subcarrier element in the spreading sequence used for spreading the data is different from one non-zero subcarrier element of at least one other spreading sequence in the plurality of spreading sequences.

4. The method of claim 1, wherein the spreading sequence has a length corresponding to a number of subcarriers available in the wireless network.

5. The method of claim 1, wherein a value of the non-zero subcarrier elements in the spreading sequence is equal to 1.

6. The method of claim 1, wherein the number of non-zero subcarrier elements in the spreading sequence is greater than 2.

7. The method of claim 1, wherein the spreading sequence used for spreading the data at the first device is a first spreading sequence, the plurality of spreading sequences comprising at least one spreading sequence having a different number of non-zero subcarrier elements than the first spreading sequence.

8. The method of claim 1, wherein the spreading sequence used for spreading the data at the first device is a first spreading sequence, the plurality of spreading sequences comprising at least one spreading sequence having a different sparsity level and a different length than the first spreading sequence.

9. The method of claim 1, wherein the spreading sequence used for spreading data at the first device is selected from a first device-specific partial subset of the plurality of spreading sequences configured for the first device.

10. The method of claim 1, wherein the spreading sequence used for spreading data at the first device has a different sparsity level and a different length than a spreading sequence selected for a third device from the plurality of spreading sequences to use for spreading data in the wireless network.

11. The method of claim 1, wherein the sparsity in the frequency domain corresponds to pulse repetition in the time domain.

12. The method of claim 1, wherein the spacing between adjacent non-zero subcarrier elements in the at least two sequences is constant and the at least two spreading sequences provide single carrier Peak-to-Average Power Ratio (PAPR).

13. The method of claim 1, wherein each sparsity pattern is corresponding to a codebook, and the codebook comprises multiple spreading sequences that are generated from different phase rotations in the frequency domain by assigning the non-zero subcarrier elements of spreading sequence values corresponding to column values of a rotated Discrete Fourier Transform (R-DFT) matrices.

14. The method of claim 1, wherein non-zero subcarrier element values are based on column values of rotated Discrete Fourier Transform (R-DFT) matrices and the resulting spreading sequences that share a common sparsity pattern have different pulse offsets in the time domain.

15. A transmitter device comprising:
a spreader configured to spread data with a spreading sequence to generate multi-carrier spread data on subcarriers corresponding to non-zero subcarrier elements of the spreading sequence, the spreading sequence having sparsity of non-zero subcarrier elements and an equal spacing between adjacent non-zero subcarrier elements; and
a transmitter configured to transmit the multi-carrier spread data,
wherein the spreading sequence is selected from a plurality of spreading sequences, each spreading sequence of the plurality having a respective equal spacing between adjacent non-zero subcarrier elements, the spreading sequences of the plurality differing from one another in at least one of:
sparsity level in a frequency domain, the sparsity level corresponding to a repetition level in a time domain; and
sparsity pattern in the frequency domain, the sparsity pattern being manifested as non-zero subcarrier element collision in the frequency domain,
at least two of the spreading sequences of the plurality of spreading sequences having different sparsity levels in the frequency domain.

16. The transmitter device of claim 15, wherein the spreader is configured such that at least one non-zero subcarrier element in the spreading sequence used for spreading the data collides with one non-zero subcarrier element of at least one other spreading sequence in the plurality of spreading sequences, and at least one other non-zero subcarrier element in the spreading sequence used for spreading the data is different from one non-zero subcarrier element of at least one other spreading sequence in the plurality of spreading sequences.

17. The transmitter device of claim 15, wherein the spreader is configured such that the spreading sequence has a length corresponding to a number of subcarriers available in the wireless network.

18. The transmitter device of claim 15, wherein a value of the non-zero subcarrier elements in the spreading sequence is equal to 1.

19. The transmitter device of claim 15, wherein the number of non-zero subcarrier elements in the spreading sequence is greater than 2.

20. A communication device configured to send data to a wireless network, the communication device comprising the transmitter device of claim 15.

21. The transmitter device of claim 15, wherein the spreading sequence used for spreading the data at the transmitter device is a first spreading sequence, the plurality of spreading sequences comprising at least one spreading sequence having a different number of non-zero subcarrier elements than the first spreading sequence.

22. The transmitter device of claim 15, wherein the spreading sequence used for spreading the data at the transmitter device is a first spreading sequence, the plurality of spreading sequences comprising at least one spreading sequence having a different sparsity level and a different length than the first spreading sequence.

23. The transmitter device of claim 15, wherein the spreading sequence used for spreading data at the transmitter device is selected from a first device-specific partial subset of the plurality of spreading sequences configured for the transmitter device.

24. The transmitter device of claim 15, wherein the spreading sequence used for spreading data at the transmitter device has a different sparsity level and a different length than a spreading sequence selected for another transmitter device from the plurality of spreading sequences to use for spreading data.

25. The transmitter device of claim 15, wherein the sparsity in the frequency domain corresponds to pulse repetition in the time domain.

26. The transmitter device of claim 15, wherein the spacing between adjacent non-zero subcarrier elements in the at least two sequences is constant and the at least two spreading sequences provide single carrier Peak-to-Average Power Ratio (PAPR).

27. The transmitter device of claim 15, wherein each sparsity pattern is corresponding to a codebook, and the codebook comprises multiple spreading sequences that are generated from different phase rotations in the frequency domain by assigning the non-zero subcarrier elements of spreading sequence values corresponding to column values of rotated Discrete Fourier Transform (R-DFT) matrices.

28. The transmitter device of claim 15, wherein non-zero subcarrier element values are based on column values of rotated Discrete Fourier Transform (R-DFT) matrices and the resulting spreading sequences that share a common sparsity pattern have different pulse offsets in the time domain.

\* \* \* \* \*